United States Patent
Yi et al.

(10) Patent No.: US 7,606,206 B2
(45) Date of Patent: Oct. 20, 2009

(54) APPARATUS AND METHOD FOR RECEPTION OF NEIGHBORING CELL SERVICE

(75) Inventors: Seung-June Yi, Seoul (KR); Young-Dae Lee, Gyeonggi-Do (KR); Sung-Duck Chun, Seoul (KR)

(73) Assignee: LG Electronics, Inc., Seoul (KR)

( * ) Notice: Subject to any disclaimer, the term of this patent is extended or adjusted under 35 U.S.C. 154(b) by 594 days.

(21) Appl. No.: 11/105,644

(22) Filed: Apr. 13, 2005

(65) Prior Publication Data

US 2005/0237961 A1    Oct. 27, 2005

(30) Foreign Application Priority Data

Apr. 14, 2004    (KR) .................. 10-2004-0025894

(51) Int. Cl.
*H04B 7/216* (2006.01)

(52) U.S. Cl. .............. 370/335; 370/432; 370/390; 370/342; 455/422.1

(58) Field of Classification Search ............... None
See application file for complete search history.

(56) References Cited

U.S. PATENT DOCUMENTS

| | | | |
|---|---|---|---|
| 6,374,117 B1 | 4/2002 | Denkert et al. | |
| 7,319,667 B1 | 1/2008 | Biederman | |
| 2001/0055298 A1 | 12/2001 | Baker et al. | |
| 2002/0089993 A1 | 7/2002 | Suumaki et al. | |
| 2003/0100325 A1 | 5/2003 | Paila et al. | |
| 2004/0057437 A1 | 3/2004 | Daniel et al. | |
| 2004/0077355 A1 | 4/2004 | Krenik et al. | |
| 2004/0156332 A1* | 8/2004 | Terry et al. | 370/328 |
| 2005/0074024 A1 | 4/2005 | Kim et al. | |
| 2005/0075124 A1* | 4/2005 | Willenegger et al. | 455/522 |
| 2005/0147040 A1 | 7/2005 | Vayanos et al. | |
| 2006/0106865 A1* | 5/2006 | Beming et al. | 707/104.1 |
| 2006/0229082 A1* | 10/2006 | Terry | 455/450 |
| 2007/0053336 A1* | 3/2007 | Petrovic et al. | 370/343 |

FOREIGN PATENT DOCUMENTS

| | | |
|---|---|---|
| CN | 1318267 | 10/2001 |
| EP | 1467586 A2 | 10/2004 |
| WO | WO 00/16581 A1 | 3/2000 |

* cited by examiner

*Primary Examiner*—Duc C Ho
(74) *Attorney, Agent, or Firm*—Lee, Hong, Degerman, Kang & Waimey

(57) ABSTRACT

A method for a mobile terminal to receive a service in mobile communications comprises the steps of detecting that the service is unavailable from a serving cell that serves the mobile terminal, and then either receiving the service from at least one neighboring cell from which the service is available while the serving cell continues to serve the mobile terminal, or selecting a cell among cells from which the service is available and receiving the service from the selected cell.

12 Claims, 6 Drawing Sheets

APPARATUS AND METHOD FOR RECEPTION OF NEIGHBORING CELL SERVICE

CROSS REFERENCE TO RELATED APPLICATIONS

The present application claims the benefit of Korean application number 10-2004-025894, filed Apr. 14, 2004 the disclosure of which is incorporated herein by reference.

BACKGROUND

The present invention relates to an apparatus and method for a terminal to receive a service from a neighboring cell if the service cannot be advantageously provided from a cell that is supposed to handle the terminal in a UMTS (Universal Mobile Telecommunications System) type IMT-2000 system. In particular, the present invention relates to an apparatus and method for a terminal to receive a service from a neighboring cell whereby the network checks whether a particular service is being provided by a neighboring cell if the service cannot be provided by a particular cell and informs the information of the neighboring cell that can provide the service, while if the terminal receives information of a neighboring cell because the desired service cannot be properly provided from the cell that is supposed to handle the terminal, a radio bearer that is requested by the neighboring cell is configured for that service, and the service is provided from the neighboring cell.

FIG. 1 illustrates an exemplary basic architecture of a UMTS network. As shown in FIG. 1, the UMTS is roughly divided into a terminal 100 (mobile station, user equipment (UE), etc.), a UMTS Terrestrial Radio Access Network (UTRAN) 120, and a core network (CN) 130. The UTRAN 120 includes one or more radio network sub-systems (RNS) 125. Each RNS 125 includes a radio network controller (RNC) 123, and a plurality of base stations (Node-Bs) 121 managed by the RNC 123. One or more cells exist for each Node B 121.

FIG. 2 illustrates a radio interface protocol architecture that exists in the mobile terminal and in the UTRAN as one pair, for handling data transmissions via the radio interface. Regarding each radio protocol layer, the first layer (Layer 1) is a physical layer (PHY) that serves the purpose of transmitting data over the radio interface by using various radio transmission techniques. The PHY layer is connected with an upper layer, the MAC layer via transport channels, which include a dedicated transport channel and a common transport channel depending upon whether that channel is shared or not.

In the second layer (Layer 2), a medium access control (MAC) layer, a radio link control (RLC) layer, a packet data convergence protocol (PDCP) layer and a broadcast/multicast control (BMC) layer exist. The MAC layer serves the purpose of mapping various logical channels to various transport channels, as well as performing logical channel multiplexing for mapping a plurality of logical channels to a single transport channel. The MAC layer is connected to a higher layer, the RLC layer, via logical channels, and these logical channels are divided into control channels that transmit control plane information and traffic channels that transmit user plane information.

The RLC layer handles the guaranteeing of the quality of service (QoS) of each radio bearer (RB) and the transmission of the corresponding data thereof. To guarantee the unique QoS of a radio bearer, the RLC layer has therein one or two independent RLC entities for each radio bearer, and provides three types of RLC modes; a transparent mode (TM), an unacknowledged mode (UM), and an acknowledged mode (AM), in order to support the various QoS. Also, the RLC layer adjusts the data size accordingly such that a lower layer may transmit data over the radio interface, by performing segmentation and concatenation on the data received from an upper layer.

The PDCP layer is located above the RLC layer and allows data that is transmitted by using Internet Protocol (IP) packets, such as IPv4 or IPv6, to be effectively transmitted over a radio interface having a relatively smaller bandwidth. For this purpose, the PDCP layer performs a header compression function, whereby only the absolutely necessary data in the header portion of the data are transmitted, in order to increase transmission efficiency over the radio interface. Because header compression is its basic function, the PDCP layer only exists in the PS (packet switched) domain, and a single PDCP entity exists per each radio bearer (RB) for providing effective header compression function with respect to each PS service.

Additionally, in the second layer (L2), a BMC (Broadcast/Multicast Control) layer exists above the RLC layer for performing the functions of scheduling cell broadcast messages and broadcasting to terminals located in a particular cell.

The radio resource control (RRC) layer located at the lowest portion of the third layer (L3) is only defined in the control plane, for controlling the parameters of the first and second layers and for controlling the transport channels and the physical channels in relation to the configuration, the re-configuration, and the releasing of the radio bearers (RBs). Here, the RB refers to a logical path provided by the first and second layers of the radio protocol for data transfer between the terminal and the UTRAN. And in general, configuration of a radio bearer (RB) refers to regulating the protocol layers and the channel characteristics of the channels required for providing a specific service, as well as setting their respective specific parameters and operation methods.

When the RRC layer of the terminal and the RRC layer of the UTRAN are logically connected together such that RRC messages can be sent and received, such logical connection is called a RRC connection, and the terminal is said to be in RRC connected state. When the terminal is in RRC connected state, the UTRAN knows the cell in which the terminal is located in, and thus direct control of the terminal is possible. In contrast, when there is no RRC connection between the UTRAN and the terminal, the terminal is said to be in idle state and the UTRAN is not aware of the existence of the terminal, and the core network can determine the location area or routing area (which are larger areas than a cell) in which the terminal is located in. Thus, the existence of an idle state terminal can only be determined in terms of (or in units on large areas (e.g., location areas or routing areas), and in order to receive typical mobile communication services such as voice or data, the terminal must establish an RRC connection and enter into connected state.

Next, multimedia broadcast/multicast service (MBMS) will be described. MBMS refers to a downlink transmission service for providing data services such as, streaming services (e.g., multimedia, video on demand, webcast, etc.) or background services (e.g., e-mail, short message services (SMS), downloading, etc.), to a plurality of terminals by employing a downlink dedicated MBMS bearer service. A single MBMS service is comprised of one or more sessions, and MBMS data is transmitted to the plurality of terminals through an MBMS radio bearer while a session is ongoing.

MBMS can be classified into a broadcast mode and a multicast mode. The MBMS broadcast mode refers to transmitting multimedia data to all users within a broadcast area, which is a region where broadcast service is possible. In contrast, MBMS multicast mode refers to transmitting multimedia data to only a certain specified user group within a multicast area, whereby a multicast area, which is a region where multicast service is possible.

The UTRAN employs a radio bearer to provide a MBMS bearer service to a terminal. The types of MBMS bearers used by the UTRAN include a point-to-multipoint (p-t-m) radio bearer and a point-to-point (p-t-p) radio bearer. Here, the point-to-point radio bearer (RB) is a bi-directional RB that comprises a logical channel DTCH (Dedicated Traffic CHannel), a transport channel DCH (Dedicated CHannel), and a physical channel DPCH (Dedicated Physical CHannel). The point-to-multipoint RB is a uni-directional downlink RB that comprises a logical channel MTCH (MBMS Traffic CHannel), a transport channel FACH (Forward Access CHannel), and a physical channel SCCPCH (Secondary Common Control Physical CHannel). A logical channel MTCH is configured for each MBMS service provided to one cell, and is used to transmit user plane data of a particular MBMS service to a plurality of terminals.

The UTRAN providing the MBMS service transmits via the logical channel MCCH (MBMS Control CHannel), MBMS-related RRC messages, namely, control messages to a plurality of terminals. Here, the MCCH is a point-to-multipoint downlink channel, and is mapped to a transport channel FACH (Forward Access CHannel), while the transport channel FACH is mapped to a physical channel SCCPCH (Secondary Common Control Physical CHannel). Examples of MBMS-related RRC messages transmitted through the MCCH include, MBMS service information and MBMS radio bearer information. Here, MBMS service information transmits to the terminals wishing to receive the MBMS service, an ID (identification) list of MBMS services that are ongoing in a corresponding cell and transmits the type of radio bearer for the corresponding MBMS service. Also, when a particular MBMS service uses a point-to-multipoint radio bearer for a corresponding cell, the MBMS radio bearer information transmits information about the point-to-multipoint radio bearer for that service to those terminals that wish to receive that service.

A terminal that wishes to receive a particular MBMS service by using a point-to-multipoint radio bearer receives MBMS service information through the MCCH. If the MBMS service information received by the terminal instructs that the MBMS radio bearer information should be received for a particular MBMS service, the terminal obtains through the MBMS radio bearer information, the necessary information for configuring a MBMS radio bearer at the terminal for receiving the particular MBMS service. Namely, if the MBMS service information received by the terminal includes the ID of a particular MBMS service, and if the type of radio bearer for the particular MBMS service is informed to be a point-to-multipoint type, the terminal receives the MBMS radio bearer information to obtain the point-to-multipoint radio bearer information, and configures a point-to-multipoint radio bearer at the terminal by using this information.

FIG. 3 shows a process in which a UMTS network provides a particular MBMS service (service 1) by using multicast mode. Also, FIG. 3 depicts an example when the UEs (UE1 and UE2) receive a particular service (service 1). First, the users (UE1 and UE2) desiring to receive a MBMS service must perform a subscription procedure. Here, subscription refers to the acts of establishing a relationship between the service provider and the user.

Also, users (UEs) wishing to receive an MBMS service must also receive a service announcement provided from the network. Here, service announcement refers to the function of informing the terminal about a list (index) of the services to be provided and related information. Also, if the user (UE) intends to receive a multicast mode MBMS service, the user (UE) should join a multicast subscription group. Here, 'multicast group' refers to a group of users that receive a specific multicast service, and 'joining' means merging with the multicast group that has particular users who wish to receive the specific multicast service. Using this joining procedure, the terminal can inform the UTRAN of its intent to receive the particular multicast data (multicast service). In contrast, for a terminal that has joined a particular multicast group, the procedure for terminating the joining of the multicast group is referred to as 'leaving'. The above-described subscribing, joining, and leaving procedures are performed for each terminal, and a terminal may perform the subscribing, joining, and leaving procedures before, during, or any time after data transmission.

While a particular MBMS service is in progress, one or more sessions for that service may occur in sequence. Here, a session may be defined in various ways. For example, a session may be each complete episode of a multi-episode drama or a session may be certain portions of a sports program, such as scenes that show goals in a soccer match. When data to be transmitted for a particular MBMS service is generated at the MBMS data source, the core network (CN) 130 informs a session start to the RNC 123. In contrast, when there is no further data at the MBMS data source to be transmitted for a particular MBMS service, the core network (CN) 130 informs a session stop to the RNC 123. Between the session start and the session stop, a data transfer procedure for the particular MBMS service can be performed. Here, only those terminals that have joined a multicast group for the MBMS service may receive data that is transmitted by the data transfer procedure.

In the above session start procedure, the UTRAN that received the session start from the core network (CN) transmits an MBMS notification to the terminals. Here, MBMS notification refers a function of the UTRAN for informing a terminal that the transmission of data for a particular MBMS service within a certain cell is impending. The UTRAN can use the MBMS notification procedure to perform a counting operation that determines the number of terminals that wish to receive a particular MBMS service within a particular cell. The counting procedure is used to determine whether the radio bearer for providing the particular MBMS service should be configured as point-to-multipoint (p-t-m) or point-to-point (p-t-p). For selecting the MBMS radio bearer, the UTRAN internally establishes a threshold value. After performing the counting function, the UTRAN may configure a point-to-point MBMS radio bearer if the number of terminals existing within the corresponding cell is smaller than the threshold value, and may configure a point-to-multipoint MBMS radio bearer if the number of terminals existing within the corresponding cell is greater than or equal to the threshold value.

If a point-to-point radio bearer is to be configured, the UTRAN allocates a dedicated logical channel to each terminal (UE) and sends the data of the corresponding service. If a point-to-multipoint radio bearer is to be configured, the UTRAN uses a downlink common logical channel to send the data of the corresponding service.

In the related art, even if the UTRAN receives a session start for a particular MBMS service from the core network (CN), the service may not be provided from a particular cell due to abnormal operation reasons, such as a shortage of radio resources or network resources, or the like. Thus, if the UTRAN cannot receive an MBMS service from a particular cell, according to the related art, a terminal that exists in that particular cell cannot be provided with the MBMS service even if it subscribed to that MBMS service. Additionally, in the related art, the cell that cannot provide the particular MBMS service does not even provide any notification regarding the particular MBMS service, thus terminals that are located within the cell and that subscribed to that MBMS service cannot even know that the MBMS service has started and thus cannot proceed with any other reception attempts for that MBMS service.

SUMMARY OF THE INVENTION

The present invention provides a method for a mobile terminal to receive a service in mobile communications by detecting that the service is unavailable from a serving cell, and then receiving the service from at least one neighboring cell upon changing the serving cell or without changing the serving cell.

PURPOSE OF THE INVENTION

The related art problems occurring when a service cannot be provided to a terminal from one cell are addressed by the present invention in which that service is received from another neighboring cell to allow the terminal to continue receiving that service.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
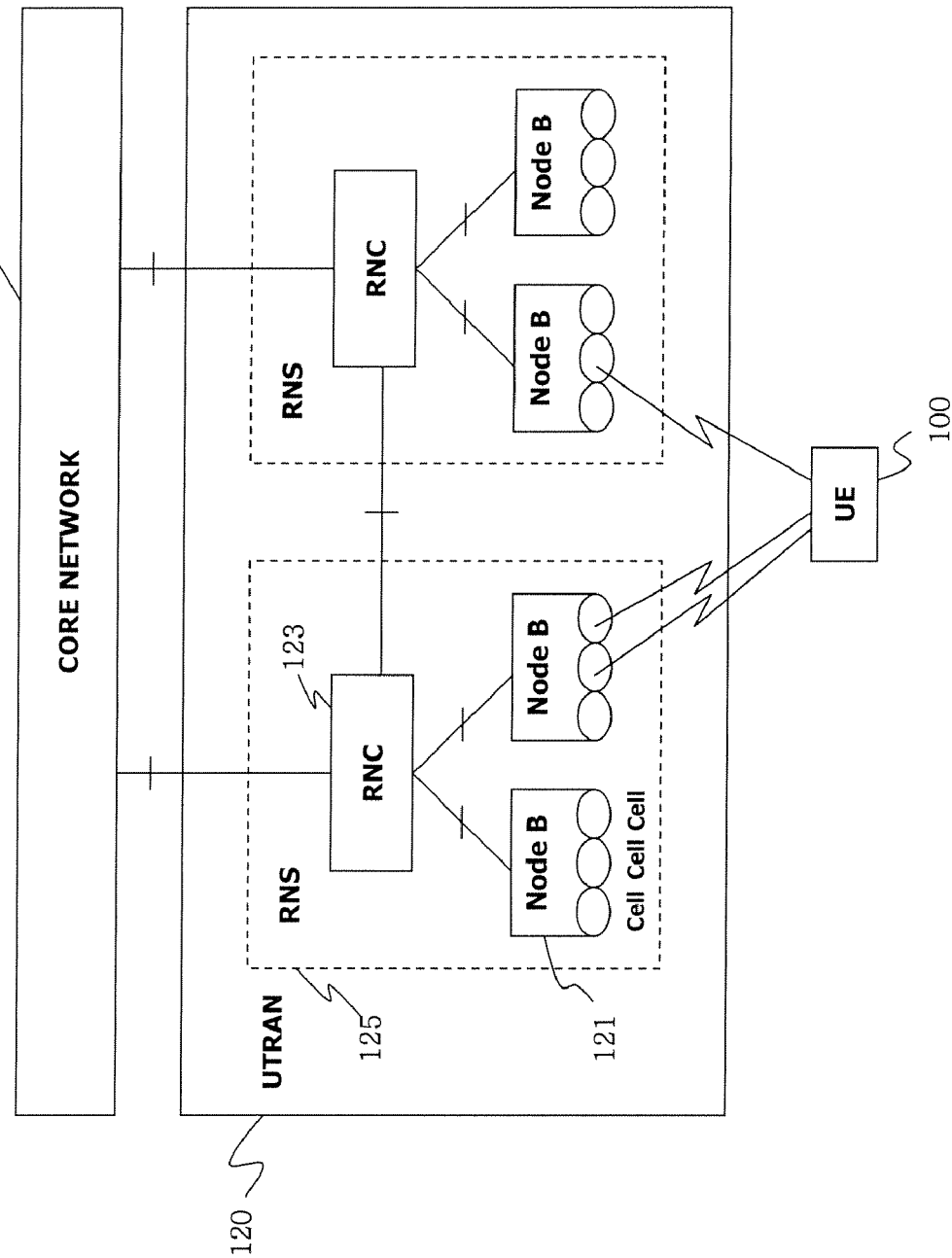
FIG. 1 depicts an exemplary basic structure of a UMTS network according to the present invention.
Figure 2:
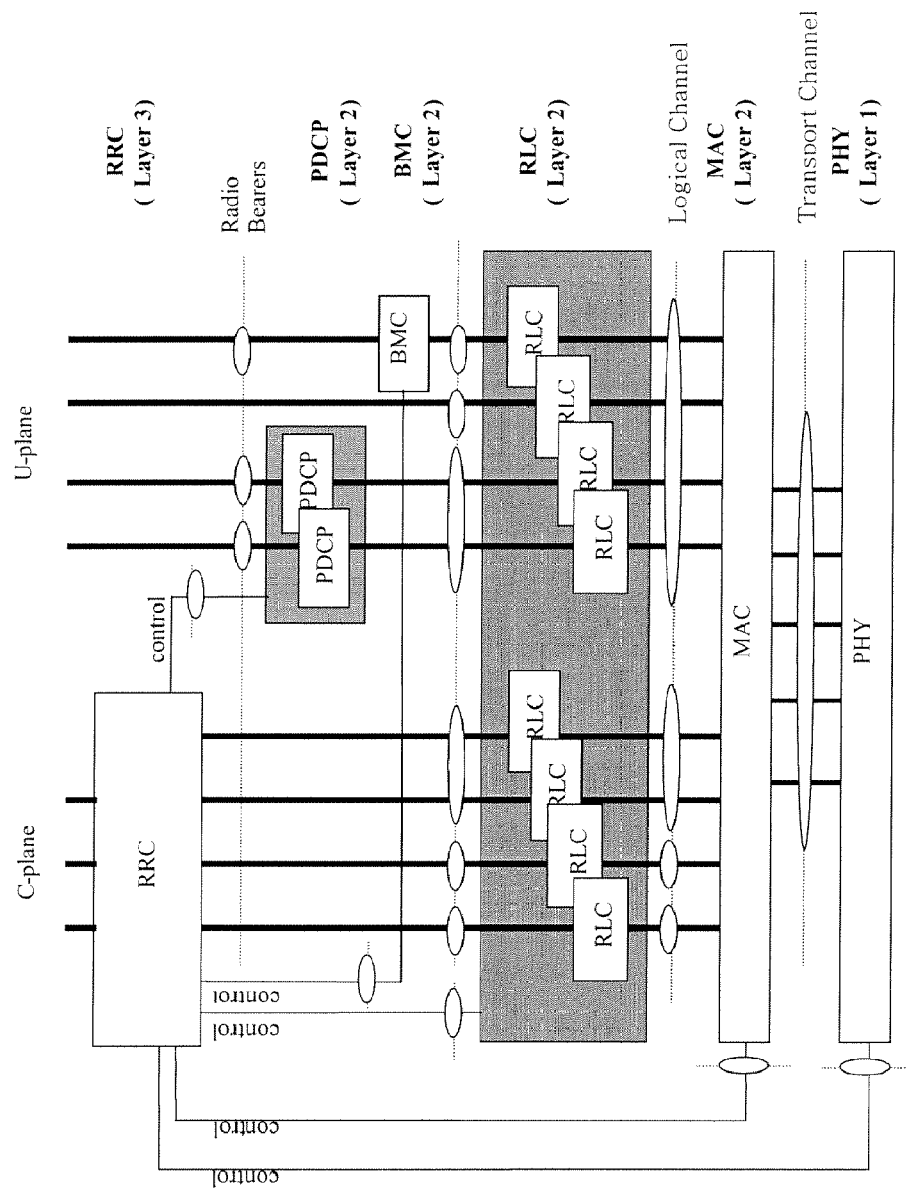
FIG. 2 depicts an exemplary radio access interface protocol architecture between the terminal and UTRAN that is based upon the 3GPP wireless access network according to the present invention.
Figure 3:
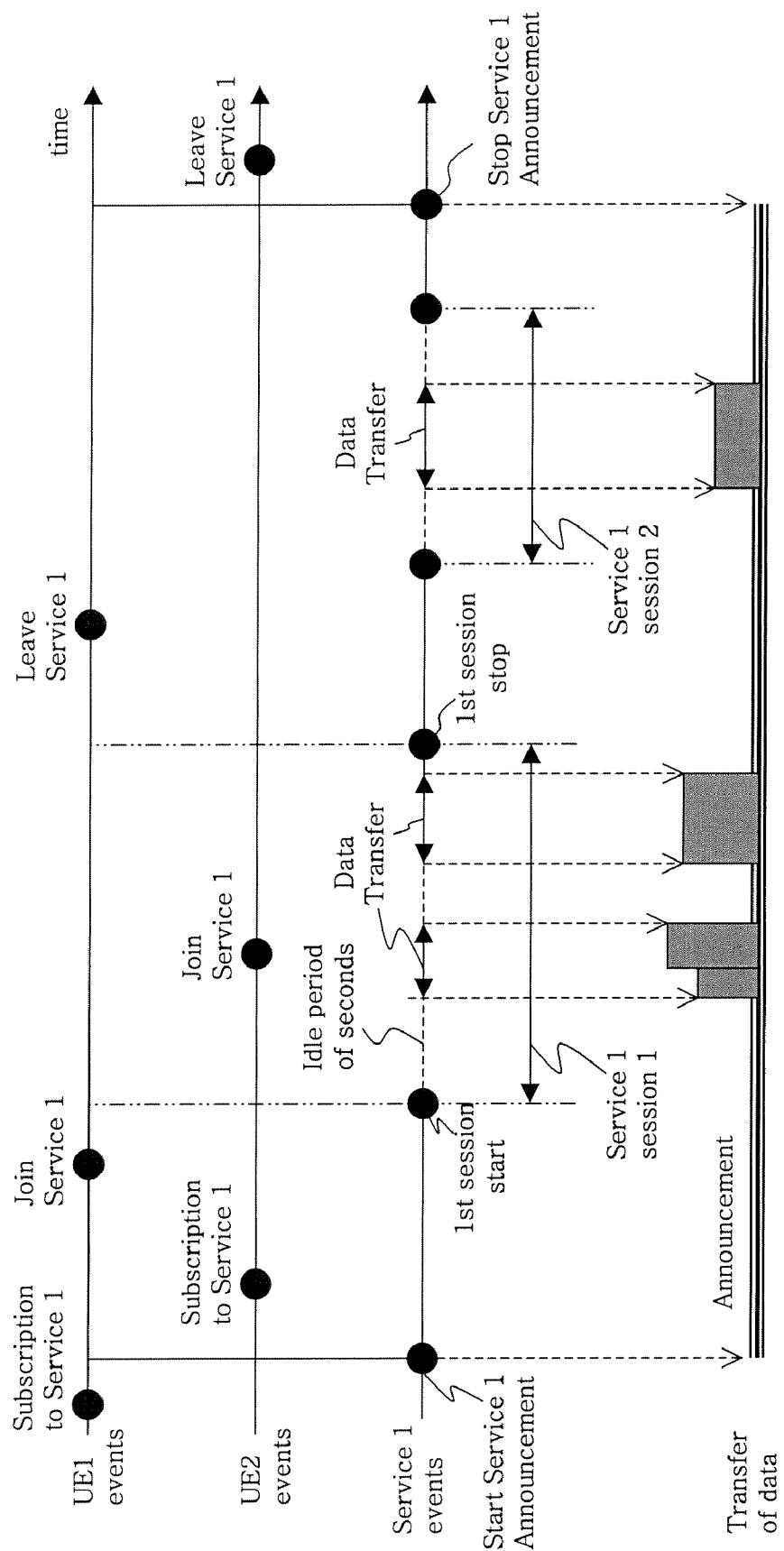
FIG. 3 depicts an exemplary process in which a UMTS network provides a particular MBMS service (service 1) by using multicast mode to the UEs (UE1 and UE2).

The following description is based upon the presently preferred to exemplary and non-limiting embodiments of the present invention. More particularly, various inventive concepts and principles embodied in systems and methods therein are discussed and described.

In the present invention, if a particular service cannot be provided for a particular cell, the UTRAN can inform the terminals within that particular cell of the fact that the particular service is in progress (on-going) but the particular service cannot be provided, and if a terminal within that cell receives information from the UTRAN indicating that the service it subscribed to cannot be properly provided by the cell in which it is located in (i.e., the serving cell), then the service is provided by and received from a cell that is neighboring (i.e., a neighboring cell) to that serving cell.

Hereafter, a preferred operation method of the UTRAN will be explained.

If the UTRAN cannot provide a particular service for a particular cell, the UTRAN transmits the service identity (Service ID) of the service together with information indicating that the service cannot be provided (e.g., "no service" information) to the terminals within that cell.

The UTRAN can transmit the no service information in various forms. Namely, the information informing that a particular service cannot be provided in a particular cell may be directly informed by transmitting a no service indicator, or may be indirectly informed by a method of not transmitting any information except for the service ID for that particular service.

The UTRAN can transmit the service ID and no service information to the terminals within a cell via a common channel, such as a MCCH (MBMS Control Channel) or a CCCH (Common Control Channel) of the corresponding cell. This is to inform those terminals, which are able to receive a common channel while in RRC idle state or in RRC connected state that a particular service cannot be provided.

The UTRAN can transmit the service ID and no service information to the terminals within a cell via a dedicated channel, such as a DCCH (Dedicated Control Channel) of the corresponding cell. This is to inform those terminals, which are not able to receive a common channel while in RRC connected state, that a particular service cannot be provided.

If the UTRAN cannot provide a particular service in a particular cell, the service ID and the no service information are transmitted together with information about a neighboring cell that can provide the particular service. To do so, when the UTRAN receives from the CN, a session start command for the particular service, service if the particular service cannot be provided from the particular cell, then it needs to be determined whether a neighboring cell is able to provide the particular service.

The information about the neighboring cell can be generated independently for each service. For each particular service, a neighboring cell list containing a list of neighboring cells that can provide the particular service is transmitted.

The information about the neighboring cell can be generated independently for each cell. For each neighboring cell, a service list containing a list of services that can be provided is transmitted.

The information about the neighboring cell can include information about the pilot channel of the neighboring cell to allow the terminal to perform cell searching over the radio interface. For example, the pilot channel information may include the scrambling code of the pilot channel.

The information about the neighboring cell can include information about the MCCH of the neighboring cell. For example, the MCCH information may include information about the radio bearer of the MCCH.

The information about the neighboring cell can include information about the MTCH of the neighboring cell. For example, the MTCH information may include information about the radio bearer of the MTCH.

The UTRAN can transmit the service ID, the no service information, and the neighboring cell information periodically to the cell. This is to inform those terminals having newly entered the cell or having their power newly turned on after a session start, that the service is not provided within the cell. Here, the period used for transmitting each type of information may be respectively different.

The UTRAN can transmit the cell or neighboring cell information upon updating according to the conditions (status) of the cell or neighboring cell. This is for transmitting appropriate cell or neighboring cell information if the cell or neighboring cell information conditions (status) change while a session is on going. For example, if a particular service cannot be provided upon session start but can later be provided while the session is on going due to improved conditions (status), the UTRAN that had transmitted no service information for the particular service upon session start, then transmits radio bearer information for the particular service when conditions (status) improved while a session is on going, to thus allow the terminals within the cell to receive the service. Also, for example, if a particular service cannot be provided by a neighboring cell upon session start but can later be provided while the session is on going due to improved conditions (status), the UTRAN that did not transmit any information about the neighboring cell upon session start, then transmits the neighboring cell information when conditions (status) in the neighboring cell improved while a session is on going such that the service can be provided.

When the UTRAN periodically transmits the service ID, no service, and neighboring cell information to the cell, such information can be updated and then transmitted for every transmission period according to the cell or neighboring cell conditions (status).

The UTRAN can transmit the neighboring cell information to the cell even if the service can be provided by the cell.

Hereafter, a preferred operation method of the terminal will be explained.

If the terminal receives information about the service that is subscribed to from the cell that it is located in, namely, from the serving cell, the terminal checks whether the service may be provided from the serving cell. Here, the checking of whether the service may be provided from the serving cell can be known from the service ID and no service information of the service.

The terminal can receive the no service information (indicating that the serving cell cannot provide the service) in many forms. Namely, the information indicating that the service cannot be provided from the serving cell can be received directly, or can be received indirectly by the fact that no other information of the service except its service ID is received. Here, as an example of such indirect reception method, if no other information of the service is received during a certain period of time after the service ID is checked, then the terminal determines that the service cannot be provided from the serving cell.

The terminal can receive the service ID and no service information from the serving cell via a common channel, such as a MCCH (MBMS Control Channel) of a CCCH (Common Control Channel). This is possible if the terminal is in RRC idle state or in RRC connected state and can receive a common channel.

The terminal can receive the service ID and no service information from the serving cell via a dedicated channel, such as a DCCH (Dedicated Control Channel). This is possible if the terminal is in RRC connected state but cannot receive a common channel.

The terminal can receive information about a neighboring cell that can provide the service, together with the service ID and no service information from the serving cell.

The terminal can independently receive the neighboring cell information for each service from the serving cell. Namely, the terminal receives from the serving cell, a neighboring cell list containing a list of neighboring cells that can provide each type of service and checks to see if there are any neighboring cells that can provide the service it subscribed to.

The terminal can independently receive the neighboring cell information from the serving cell for each individual neighboring cell. Namely, the terminal receives from the serving cell, a service list for each neighboring cell containing a list of services that the neighboring cell can provide and checks to see if there are any neighboring cells that can provide the service it subscribed to.

The terminal can check from the neighboring cell information about whether there are any neighboring cells that can provide the service it subscribed to, and receives a pilot channel of the neighboring cells the can provide the service. Here, the pilot channel information is included in the neighboring cell information, and an example would be the scrambling code of the pilot channel.

The terminal can check from the neighboring cell information about whether there are any neighboring cells that can provide the service it subscribed to, and receives the MCCH of the neighboring cells that can provide the service. Here, the MCCH information is included in the neighboring cell information, and an example would be the radio bearer information of the MCCH.

The terminal can check from the neighboring cell information about whether there are any neighboring cells that can provide the service it subscribed to, and receives the MTCH of the neighboring cells the can provide the service. Here, the MTCH information is included in the neighboring cell information, and an example would be the radio bearer information of the MCCH.

The terminal can periodically receive from the serving cell, the service ID, no service information, and neighboring cell information. This is to allow changes in the reception method of the terminal according to the changes in the cell conditions (status). Here, the reception period for each information may be respectively different.

The terminal can receive neighboring cell information even if the serving cell can provide the service it subscribed to.

Upon receiving the neighboring cell information from the serving cell, the terminal can measure the quality of the pilot channel, the MCCH, or the MTCH of each neighboring cell that can provide the service that the terminal has subscribed to. Here, there are many factors in measuring channel quality, including the power level, error rate, delay (or latency), transmission bit rate, and the like.

By measuring the channel quality of the neighboring cells, the terminal can select the neighboring cell that can provide the service it subscribed to with the best quality. Here, the terminal may select one or more neighboring cells.

By measuring the channel quality of the neighboring cells, the terminal can select neighboring cells that can provide the service at or above a certain threshold quality. Here, the threshold is determined by the RRC of the terminal. If the quality of all the neighboring cells fall below the threshold, the terminal informs the user that service reception is not possible and no longer attempts to receive the service.

The terminal can configure a radio bearer that is required by the selected neighboring cell, and receives the service it subscribed to from the neighboring cell.

Figure 4:
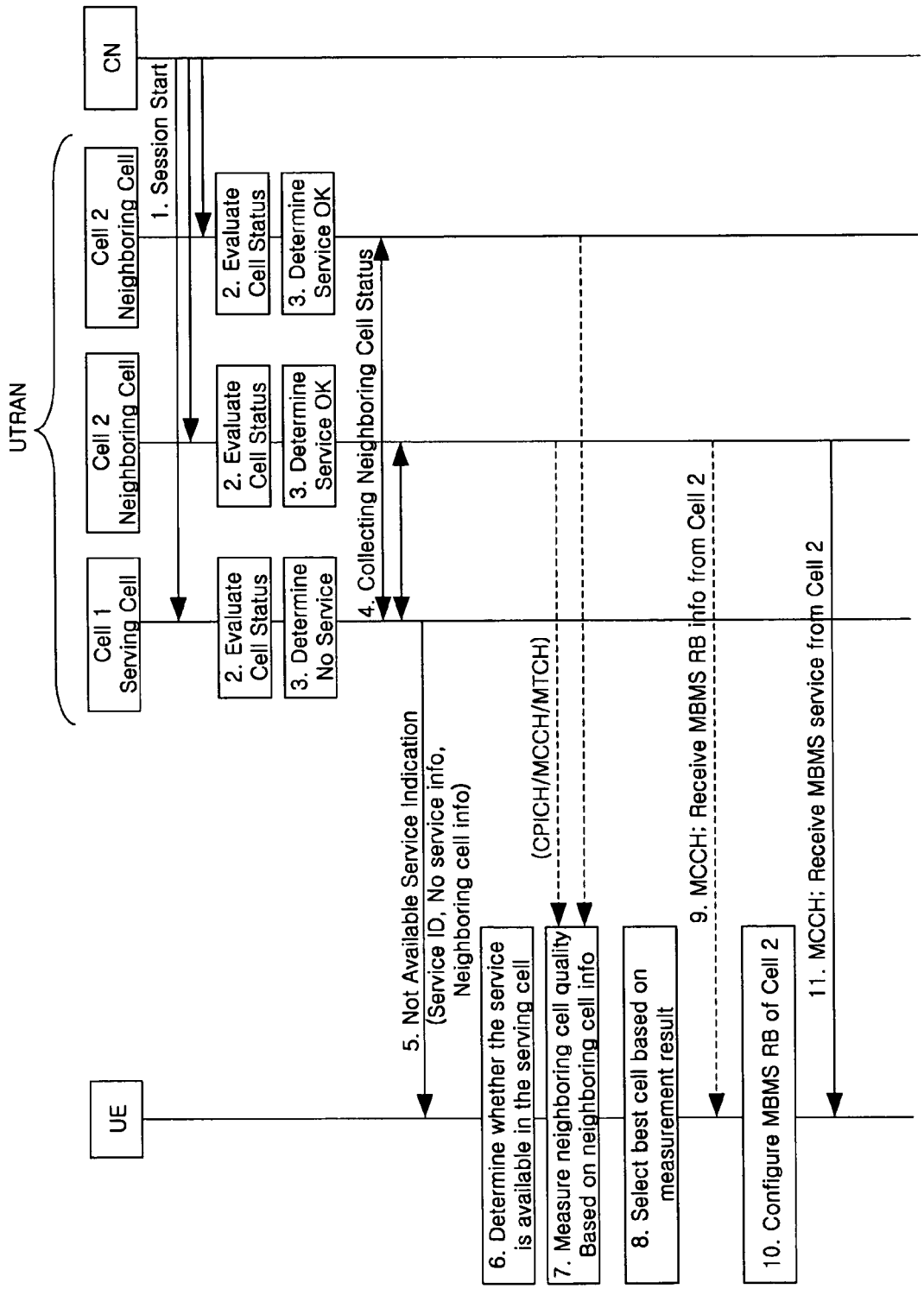
FIG. 4 depicts an exemplary method for the terminal of receiving a service from a neighboring cell according to the present invention.

Referring to the example of FIG. 4, an exemplary method for the terminal of receiving a service from a neighboring cell according to the present invention will be explained.

It is assumed that the terminal is located within Cell 1, and is subscribed to MBMS Service 1. Here, the serving cell of the terminal is Cell 1, and the neighboring cells are Cell 2 and Cell 3.

In step 1, the UTRAN that manages Cells 1, 2, 3 receives a Session Start command of MBMS Service 1 from the CN.

In step 2, the UTRAN that manages Cells 1, 2, 3 determines a Cell Status by determining whether the radio resources for providing the MBMS Service 1 are sufficient, counting the number of terminals that wish to receive the service, and the like.

In step 3, after determining the cell status, each cell determines whether the service can be provided. In the example of FIG. 4, the serving cell (Cell 1) cannot provide the service, and it is determined that the service can be provided in the neighboring cells (Cell 2 and Cell 3).

In step 4, the serving cell (Cell 1) that cannot provide the service, checks its neighboring cells (Cells 2 and Cell 3) to see if the service can be provided therein. In the example of FIG. 4, Cell 2 and Cell 3 inform Cell 1 that they can provide the service.

In step 5, Cell 1 informs the terminals within the cell that the service cannot be provided via a common channel, namely the MCCH (MBMS Control Channel). Here, the not available service indication comprises a service ID, no service info, neighboring cell info, etc. Also, the neighboring cell info comprises at least one of a CPICH (Common Pilot Channel) info, a MCCH (MBMS Control Channel) info, or a MTCH (MBMS Traffic Channel) info.

In step 6, upon receiving the not available service indication via the MCCH, the terminal first checks the service ID and no service data to determine whether the service it desires can be provided by its serving cell. In the example of FIG. 4, the terminal determines that the service it subscribed to cannot be provided by its serving cell, and receives information of the neighboring cells that can provide the service.

In step 7, using the received neighboring cell information, the terminal measures the quality of the neighboring cells that can provide the service. Here, the neighboring cell quality measurement is performed through the quality measurement of the CPICH, MCCH, or MTCH according to the contents included in the neighboring cell information. For each channel, the quality measurement includes the measurement of the power level, error rate, delay, and bit rate.

In step 8, based upon the measurement results, the terminal selects the neighboring cell with the best quality. Upon measuring the quality, if the neighboring cell is selected only if the quality is above a certain threshold, a step of comparing the measured quality and the threshold is also performed. In the example of FIG. 4, the terminal selected Cell 2 because its quality is the best and over the threshold. However, the terminal may select more than one neighboring cell.

In step 9, the terminal receives the MCCH from the selected neighboring cell (Cell 2) and receives the MBMS radio bearer information of the service that it wishes to receive. If in step 5, the MBMS radio bearer information was already received because the neighboring cell information included the MBMS radio bearer information of the neighboring cell, or if in step 7, the MBMS radio bearer information was already received during measurement of the neighboring cell quality, then this step 9 may be omitted.

In step 10, the terminal establishes the MBMS radio bearer according to the received MBMS radio bearer information of Cell 2.

In step 11, the terminal receives the MBMS service that it subscribed to from Cell 2 via the established MBMS radio bearer.

Regarding the effects of the present invention, as described thus far, from the point of view of the terminal, the present invention allows the terminal to receive a service from a neighboring cell in situations where the service cannot be provided because of unfavorable conditions (status) of a particular cell, and thus has the advantage of allowing the terminal to be provided with the desired service whatever the condition (status) may be. Also, from the point of view of the network, the provided service can be allocated (divided) according to the cell status (conditions), thus cell planning and radio resource management can be effectively performed.

Figure 5:
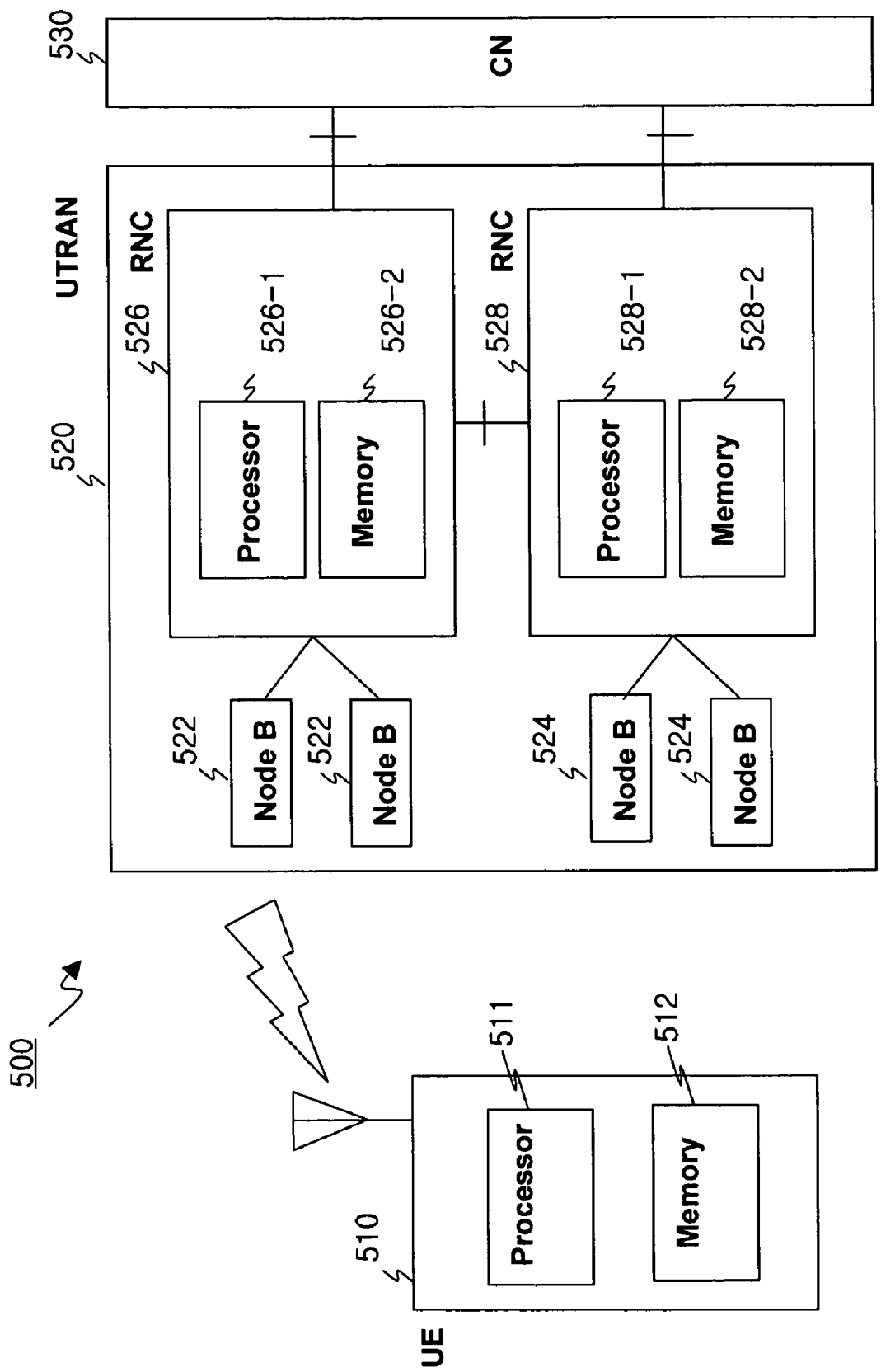
FIG. 5 depicts an exemplary communications system according to the present invention.

The present invention can employ a variety of software, hardware, and/or a combination thereof to achieve the above-identified procedures and steps for radio bearer (RB) release. For example, FIG. 5 depicts a communication system comprising a terminal (UE 510) in radio communication with a network (UTRAN 520 and CN 530) according to an embodiment of the present invention. The network (UTRAN 520 and CN 530) may include various hardware and software components. For example, the UTRAN 520 comprises an RNC (526), being connected to a plurality of Node Bs (522), and having a processor (526-1) and a memory (526-2). An RNC (528), being connected to a plurality of Node Bs (524), may also comprise a processor (528-1) and a memory (528-2). The RNCs (526, 528) are connected with one another via an interface, and connected with the CN (530) via another interface. The network (UTRAN 520 and CN 530) handles the various processing procedures for communications with the terminal (UE 510) as described previously. Here, it should be noted that various software codes and protocols that are required for achieving the present invention may be stored in one or more memory devices and executed by one or more processors located within the Node Bs (522, 524), the RNCs (526, 528), and/or other network elements.

Figure 6:
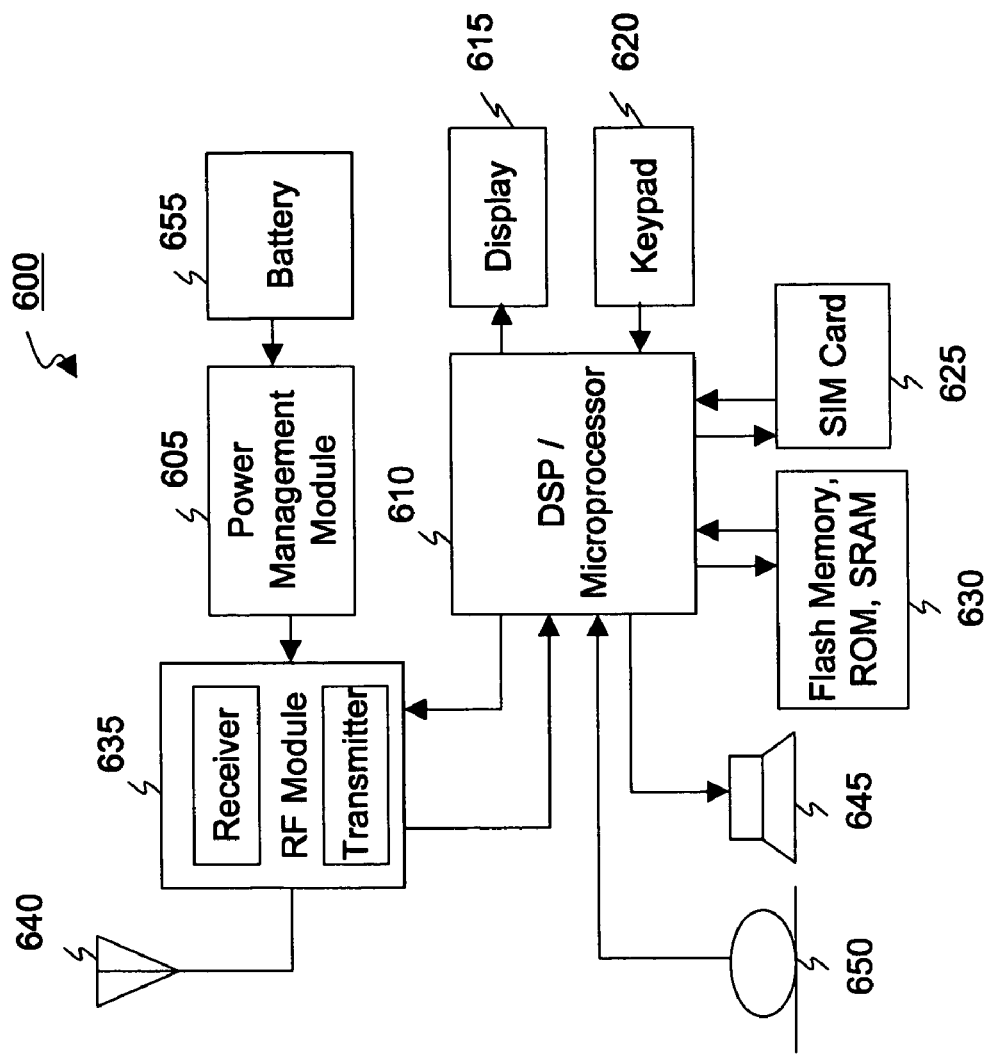
FIG. 6 depicts an exemplary user terminal according to the present invention.

FIG. 6 depicts the structure of a terminal (UE 600) according to an embodiment of the present invention. The terminal (UE 600) may include various hardware and software components. For example, there are processing circuits and memory devices, such as, a DSP/Microprocessor (610), a Flash memory, ROM, SRAM (630), and a SIM card (625). Also, there is a transceiver section (transceiver) including a battery (655), a power management module (605), a RF module (635) having a receiver and a transmitter, and an antenna (640). Additionally, there are input and output components, such as a display (615), a keypad (620), a speaker (645), and a microphone (650). The terminal (UE 600) handles various signal processing procedures for communication with the network, for example, the network in FIG. 5. Here, it should be noted that various software codes and protocols that are required for achieving the present invention may be stored in one or more memory devices and executed by one or more processors within the terminal (UE 600).

The present invention provides a method for a mobile terminal to receive a service in mobile communications, comprising: detecting that the service is unavailable from a serving cell that serves the mobile terminal; and receiving the service from at least one neighboring cell from which the service is available, while the serving cell continues to serve the mobile terminal.

Preferably, the mobile terminal does not receive the service from the serving cell after receiving the service from the neighboring cell. The detecting is performed by using analyzing information received via a common channel, wherein the common channel is a MBMS control channel. Also, the detecting is performed by a radio resource control layer in the mobile terminal. Here, the service is a point-to-multipoint service, and is received via a point-to-multipoint channel. The method further comprises, receiving radio bearer information of the service of the at least one neighboring cell.

Also, the present invention provides a method for a mobile terminal to receive a service in mobile communications, comprising: detecting that the service is unavailable from a current cell; selecting a cell among cells from which the service is available; and receiving the service from the selected cell.

Here, the detecting and/or selecting is performed by a radio resource control layer in the mobile terminal, and the reliable channel quality refers to guaranteeing service quality to be above a certain threshold, and the cells are cells having reliable channel quality other than the current cell.

To implement the above methods, the present invention can employ various hardware and/or software components. For example, as shown in FIGS. 5 and 6, the terminal (510, 600) may include various components including the transceiver (655, 605, 635, 640), the processor (511, 610) and memory (512, 625, 630) for detecting that the service is unavailable from a serving cell that serves the mobile terminal, and receiving the service from at least one neighboring cell from which the service is available, while the serving cell continues to serve the mobile terminal. Also, as shown in FIGS. 5 and 6, the terminal (510, 600) may include various components including the transceiver (655, 605, 635, 640), the processor (511, 610) and memory (512, 625, 630) for detecting that the service is unavailable from a current cell, selecting a cell among cells from which the service is available, and receiving the service from the selected cell.

Although various aspects, embodiments, and features of the present invention have been described for a UMTS communications scheme, many of these techniques can be advantageously applied for other communications methods and systems.

The foregoing description of the preferred embodiments is provided to enable any person skilled in the art to make or use the present invention. Various modifications to these embodiments will be readily apparent to those skilled in the art, and the generic principles defined herein may be applied to other embodiments. Thus, the present invention is not intended to be limited to the embodiments shown herein but us to be accorded the widest scope consistent with the principles and novel features disclosed herein.

What is claimed is:

1. A mobile terminal to receive a point-to-multipoint service in mobile communications, the terminal comprising:
   a transceiver to transmit and to receive signals; and
   a processor operatively connected to and cooperating with the transceiver to detect that the point-to-multipoint service is unavailable from a current cell that serves the terminal, and either to receive the point-to-multipoint service from at least one neighboring cell from which the point-to-multipoint service is available while the serving cell continues to serve the terminal, or to select a cell among cells from which the point-to-multipoint service is available and to receive the point-to-multipoint service from the selected cell,
   wherein the point-to-multipoint service is a multimedia broadcast/multicast service (MBMS) service,
   wherein information on a common channel is used to detect whether the point-to-multipoint service is unavailable from the current cell, and
   wherein the common channel is a multimedia broadcast/multicast service (MBMS) control channel (MCCH).

2. The mobile terminal of claim 1, wherein the point-to-multipoint service is received via a point-to-multipoint channel.

3. The mobile terminal of claim 1, wherein radio bearer information of the point-to-multipoint service of the at least one neighboring cell is received by the processor.

4. The mobile terminal of claim 1, wherein at least the detecting or selecting is performed by a radio resource control layer in the mobile terminal.

5. The mobile terminal of claim 1, wherein the point-to-multipoint service is not received again from the current cell after receiving the point-to-multipoint service from the at least one neighboring cell.

6. The mobile terminal of claim 1, wherein a determination of whether to receive the point-to-multipoint service from the at least one neighboring cell or to select the cell among cells from which the point-to-multipoint service is available is based on providing a reliable channel quality that guarantees service quality above a certain threshold.

7. The mobile terminal of claim 6, wherein the at least one neighboring cell has better reliable channel quality than the current cell.

8. A method for a mobile terminal to receive a point-to-multipoint service in mobile communications, the method comprising:
   detecting that the point-to-multipoint service is unavailable from a serving cell that serves the mobile terminal; and
   selectively receiving the point-to-multipoint service from at least one neighboring cell from which the point-to-multipoint service is available while the serving cell continues to serve the mobile terminal, or selecting a cell among cells from which the point-to-multipoint service is available and receiving the point-to-multipoint service from the selected cell,
   wherein the point-to-multipoint service is a multimedia broadcast/multicast service (MBMS) service,
   wherein the detecting is performed by using information received via a common channel, and
   wherein the common channel is a multimedia broadcast/multicast service (MBMS) control channel (MCCH).

9. The method of claim 8, wherein the mobile terminal does not receive the point-to-multipoint service from the serving cell after receiving the service from the neighboring cell.

10. The method of claim 8, wherein the detecting is performed by a radio resource control layer in the mobile terminal.

11. The method of claim 8, wherein the point-to-multipoint service is received via a point-to-multipoint channel.

12. The method of claim 8, further comprising receiving radio bearer information of the point-to-multipoint service of the at least one neighboring cell.

* * * * *